US008499326B2

(12) United States Patent
Bly, Jr. et al.

(10) Patent No.: US 8,499,326 B2
(45) Date of Patent: Jul. 30, 2013

(54) APPARATUS AND METHODS FOR TESTING CABLE TELEVISION RECEIVERS

(75) Inventors: Allan Richard Bly, Jr., Atlanta, GA (US); William Sean Mahan, Sandy Springs, GA (US); Lisa Marie Moder, Wheat Ridge, CO (US); Keith Hans Ohlson, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 303 days.

(21) Appl. No.: 12/869,636

(22) Filed: Aug. 26, 2010

(65) Prior Publication Data

US 2012/0050544 A1 Mar. 1, 2012

(51) Int. Cl.
*H04N 7/173* (2011.01)
*H04N 17/02* (2006.01)
*H04N 11/00* (2006.01)

(52) U.S. Cl.
USPC ............ 725/107; 725/118; 348/181; 348/192

(58) Field of Classification Search
None
See application file for complete search history.

(56) References Cited

U.S. PATENT DOCUMENTS

| 7,587,743 | B2 * | 9/2009 | Yun .............................. 725/107 |
| 2007/0277211 | A1 * | 11/2007 | Hwang ........................ 725/118 |
| 2010/0313230 | A1 * | 12/2010 | Van Doorn et al. ........... 725/107 |
| 2011/0001833 | A1 * | 1/2011 | Grinkemeyer et al. ....... 348/192 |

OTHER PUBLICATIONS

Digital Keystone—Products Web page, screen capture.
Cable Television Laboratories—Multi-Stream CableCARD Interface, Specification, Mar. 31, 2005.

* cited by examiner

*Primary Examiner* — Chris Parry
*Assistant Examiner* — Omar S Parra
(74) *Attorney, Agent, or Firm* — Seed IP Law Group PLLC (57) ABSTRACT

Described herein are techniques for facilitating the testing of cable television receivers during manufacturing and remanufacturing. More particularly, described herein techniques for simulating a conditional access module and/or cable television communication network/head-end for use during a testing process. The simulated conditional access module allows for the testing of a cable television receiver without the use of a head-end and/or fully functional conditional access module to verify all communication paths through the cable television receiver.

20 Claims, 5 Drawing Sheets

APPARATUS AND METHODS FOR TESTING CABLE TELEVISION RECEIVERS

BACKGROUND

Cable television receivers allow viewers to receive television programming from a cable provider. Typically, the cable television receiver includes a conditional access module, often in the form of a PCMCIA/PC Card (known as a Cable-Card), that performs the decryption of encrypted television programming. The conditional access module mates with an appropriate interface of the cable television receiver to communicatively couple with various communication pathways of the cable television receiver. For example, the typical cable television receiver includes an in-band data receiver and an out-of-band data receiver which each receive data from a cable television head-end and pass data to the conditional access module for further processing. In one scenario, such data is transferred according to the Tru2Way protocol. Likewise, the cable television receiver may include an out-of-band transmitter that receives data from the conditional access module and transmits the data back to the cable television head-end.

During manufacturing of the cable television receiver, it is desirable to test all communication paths of the cable television receiver to verify operation of the device. This includes testing of in-band and out-of-band communication paths that pass through the conditional access module. However, many manufacturers do not have access to large quantities of Cable-Cards or a cable television communication network (e.g., head-end) that may be utilized for testing of the cable television receivers. Thus, other techniques are desirable to allow for full testing of cable television receivers.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the testing of cable television receivers during manufacturing and remanufacturing. More particularly, described herein are techniques for simulating a conditional access module and/or cable television communication network for use during a testing process. The simulated conditional access module allows for the testing of a cable television receiver without the use of a head-end and/or fully functional conditional access module. Thus, a manufacturer may fully verify all communication paths though the cable television receiver.

One embodiment provides a testing apparatus for insertion into a conditional access module slot of a cable television receiver. The testing apparatus comprises a housing configured for mating with a socket of a cable television receiver. The testing apparatus further includes a receiver interface communicatively coupled to an out-of-band (OOB) receiver of the cable television receiver. The receiver interface is operable to receive OOB input test data from the OOB receiver. Control logic of the testing apparatus is operable to generate OOB output test data based on the OOB input test data. The testing apparatus also includes a transmitter interface communicatively coupled to an OOB transmitter of the cable television receiver. The transmitter interface is operable to transmit the OOB output test data to the OOB transmitter.

As used herein, OOB data, OOB receivers, OOB transmitters and variants thereof refer to legacy OOB data and associated equipment. Legacy OOB data is exchanged between a CableCard and a television receiver through a six pin interface. This is contrasted with DOCSIS OOB data, which is exchanged between a CableCard and a television receiver through a three pin interface. Thus, the techniques described herein are directed at testing the communication paths of legacy OOB data.

The testing apparatus described above is capable of simulating a conditional access module of the television receiver. This allows data to be routed from a receiver interface of the cable television receiver, through the testing apparatus, to a transmitter interface of the cable television receiver for reception by a device configured to perform a verification process. Thus, a manufacturer is able to verify the correct operation of various communication paths of the cable television receiver.

Another embodiment comprises a testing apparatus that communicatively couples to a cable television receiver to simulate a head-end that exchanges data therewith. The testing apparatus communicatively couples to a communication interface of the cable television receiver and transmits testing data thereto. Furthermore, the testing apparatus receives testing data from the cable television receiver and performs analysis to determine whether one or more communication paths of the television receiver function correctly.

The testing apparatus includes an OOB transmitter communicatively coupled to a cable television receiver. The OOB transmitter is operable to transmit OOB input test data to the cable television receiver. The testing apparatus further includes an OOB receiver communicatively coupled to the cable television receiver. The OOB receiver is operable to receive OOB output test data from the cable television receiver. The testing apparatus also includes a processor operable to analyze the OOB output test data based on the OOB input test data to determine whether a communication interface of the cable television receiver functions correctly.

Another embodiment comprises a testing apparatus that simulates both the head-end and the conditional access module for testing of the cable television receiver. The testing apparatus comprises a housing configured for mating with a socket of a cable television receiver. A first OOB transmitter of the testing apparatus communicatively couples to the cable television receiver. The first OOB transmitter is operable to transmit OOB input test data to a first OOB receiver of the cable television receiver. The testing apparatus also includes a receiver interface communicatively coupled to the first OOB receiver of the cable television receiver that operates to receive the OOB input test data from the first OOB receiver of the cable television receiver. First control logic of the testing apparatus is operable to generate OOB output test data based on the OOB input test data. A transmitter interface of the testing apparatus communicatively couples to a second OOB transmitter of the cable television receiver. The transmitter interface is operable to transmit the OOB output test data to the second OOB transmitter of the cable television receiver. A second OOB receiver of the testing apparatus communicatively couples to the cable television receiver and operates to receive the OOB output test data from the second OOB transmitter of the cable television receiver. Second control logic of the testing apparatus is operable to analyze the OOB output test data based on the OOB input test data to determine whether the first OOB receiver and the second OOB transmitter of the cable television receiver function correctly.

Figure 1:
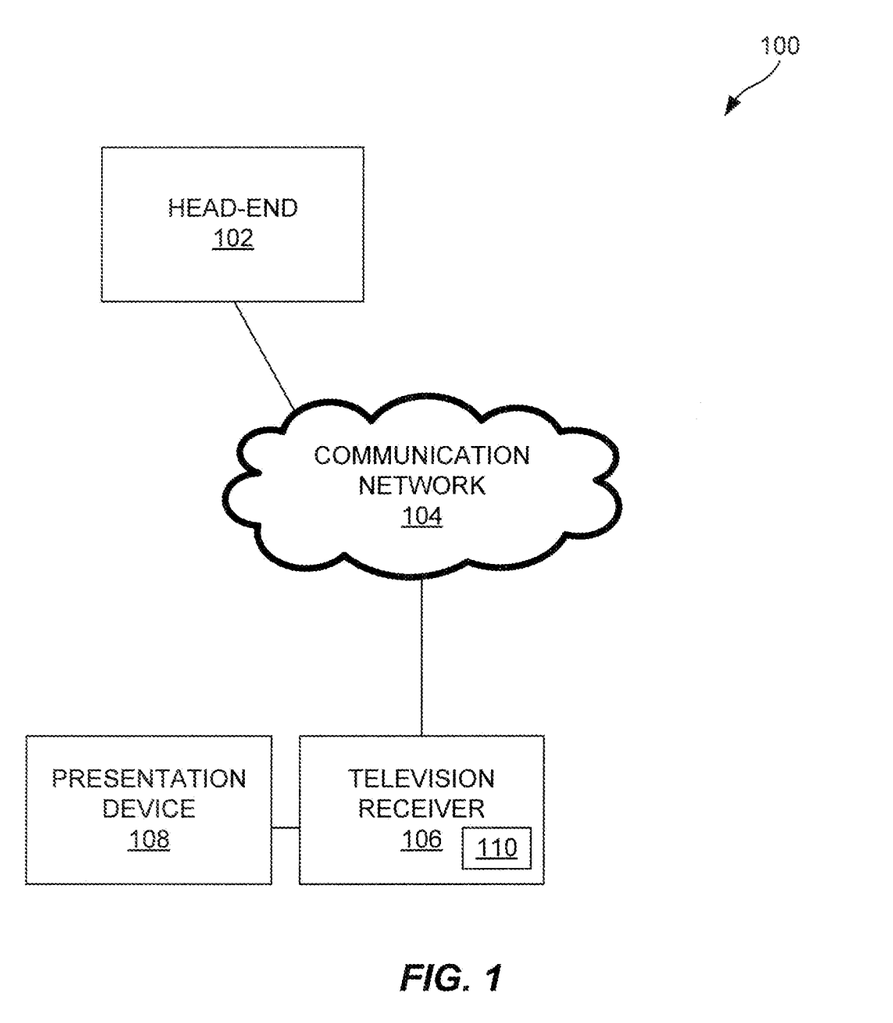
FIG. 1 illustrates an embodiment of a television distribution network.

FIG. 1 illustrates an embodiment of a television distribution network 100. The television distribution network 100 includes a head-end 102, a communication network 104, a cable television receiver 106 and a presentation device 108. The cable television receiver 106 further includes a removable conditional access module 110. Each of these components is discussed in greater detail below. The television distribution network 100 may include other components, elements or devices not illustrated for the sake of brevity.

The head-end 102 is operable for receiving, generating and communicating content to one or more television receivers 106. The content to be received, processed, outputted and/or communicated may come in any of various forms including, but not limited to, audio, video, data, information, or otherwise. In at least one embodiment, the head-end 102 is operable for receiving various forms and types of content from other sources, aggregating the content and transmitting the content to the television receiver 106 through the communication network 104. It is to be appreciated that the head-end 102 may receive practically any form and/or type of information from one or more sources including streaming television programming, recorded audio or video, electronic programming guide data and the like. The head-end 102 may then initiate transmission of the received data to the television receiver 106. In at least one embodiment, the head-end 102 may initiate transmission of access control data, such as entitlement control messages (ECMs) and entitlement management messages (EMMs) which are utilized by the television receiver 106 to control access to content and/or decrypt encrypted content.

The communication network 104 is operable to transmit content from the head-end 102 to the television receiver 106. The communication network 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary communication networks 104 include terrestrial, cable, satellite and internet protocol television (IPTV) distribution systems. In at least one embodiment, the communication network 104 broadcasts or multicasts content to a plurality of television receivers 106. The communication network 104 may also distribute content to a specific addressable television receiver 106, such as video-on-demand and the like.

Various types of data may be distributed by the communication network 104 as in-band (IB) or out-of-band (OOB) data streams, depending on desired design criteria. For example, audio/video content may be distributed as an IB data stream to the television receiver 106. Likewise, access control data/service information may be distributed as an OOB data stream to the television receiver 106.

The television receiver 106 is operable to receive content from the communication network 104 and output the received content for presentation by the presentation device 108. In at least one embodiment, the presentation device 108 is a display device (e.g., a television) configured to display content to a user. The television receiver 106 may receive an audio/video stream in any format (e.g., analog or digital format) and output the audio/video stream for presentation by the presentation device 108. The television receiver 106 may be further configured to output menus and other information that allow the user to control the output of audio/video content by the television receiver 106, view electronic programming guides (EPGs), set recording timers and the like.

The television receiver 106 includes a removable conditional access module 110 configured to perform various processing of data received by the television receiver 106. For example, the television receiver 106 may receive in-band data (e.g., access control messages) and provide such in-band data to the conditional access module 110 for further processing. In at least one embodiment, the conditional access module 110 may receive in-band data from the television receiver 106 and decrypt audio/video data for further processing and output by the television receiver 106.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver, such as a television with integrated CableCard and/or Tru2Way functionality. In this embodiment, the removable conditional access module 110 may be configured to interface with the presentation device 108 that includes cable television receiver functionality.

Figure 2:
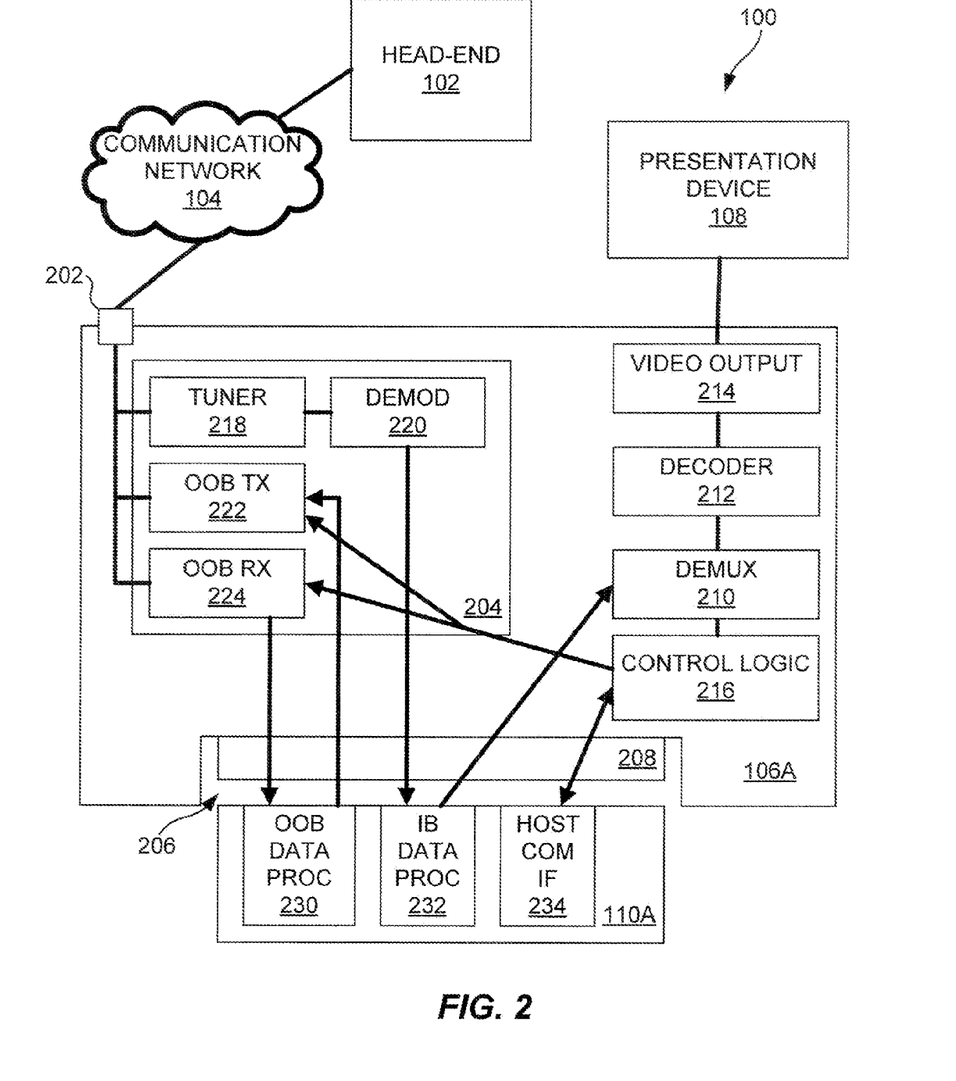
FIG. 2 illustrates details of embodiments of the television receiver and the conditional access module of FIG. 1.

FIG. 2 illustrates an embodiment of the television receiver 106 and the conditional access module 110 of FIG. 1. The television receiver 106A includes a cable connector 202, a communication interface 204, a socket 206, a conditional access module interface 208, a demultiplexor 210, a decoder 212, a video output interface 214 and control logic 216. The conditional access module 110A includes an OOB data processor 230, an IB data processor 232 and a host communication interface 234. Each of these components is discussed in greater detail below. The television receiver 106A and/or the conditional access module 110A may include other components, elements or devices not illustrated for the sake of brevity.

The cable connector 202 is operable to communicatively couple the television receiver 106A to the communication network 104. In at least one embodiment, the cable connector 202 comprises an F-connector operable to communicatively couple to the communication network 104 via coaxial cable. The cable connector 202 may also communicatively couple the television receiver 106A to other devices, such as a testing apparatus that exchanges data with the television receiver 106A.

The communication interface 204 is operable to exchange data with the communication network 104 via the cable connector 202. In at least one embodiment, the communication interface 204 includes a tuner 218, a demodulator 220, an OOB receiver 224 and an OOB transmitter 224. The communication interface 204 may include any number of integrated or discrete components, depending on desired design criteria. For example, the communication interface 204 may include a tuner 218 and a cable modem integrated circuit (IC). The cable modem IC may include the demodulator 220, the OOB receiver 224 and an OOB transmitter 224.

The tuner 218 is operable to receive in-band data transmissions, such as audio/video content, from the communication network 104. In at least one embodiment, the tuner 218 comprises a quadature amplitude modulation (QAM) MPEG receiver. The communication interface 204 may include any number of tuners 218, depending on desired design criteria. Each of the tuners 218 may operate responsive to commands from the control logic 216 to receive specified data carried on a particular frequency.

The tuner 218 operates responsive to commands received from the control logic 216 to receive data (e.g., audio/video content) modulated on a specified frequency. The tuner 218 is communicatively coupled to the demodulator 220, which receives and demodulates the desired data and provides the data to the conditional access module 110A for further processing. In at least one embodiment, a portion of the data demodulated by the demodulator 220 is encrypted and provided to the conditional access module 110A for decryption.

The demultiplexor 210 receives data from the conditional access module 110A and demultiplexes the data for further processing by the MPEG decoder 212. The MPEG decoder 212 operates to decode un-encrypted MPEG video data to generate an audio/video output stream that may be presented by the presentation device 108. The output interface 214 communicatively couples the television receiver 106A to the presentation device 108 and transfers audio/video data from the decoder 212 to the presentation device 108. For example, the presentation device 108 may be communicatively coupled to the output interface 214 through a coaxial cable, component or composite video cables, an HDMI cable, a VGA or SVGA cable, a Bluetooth or WiFi wireless connection or the like.

The control logic 216 is operable for controlling the operation of the television receiver 106A. As used herein, control logic 216 refers to a single processing device or a group of inter-operational processing devices. The operation of control logic 216 may be controlled by instructions executable by control logic 216. Some examples of instructions are software, program code and firmware. Various embodiments of control logic 216 include any sort of microcontroller or microprocessor executing any form of software code. In at least one embodiment, the control logic 216 controls the reception of data and/or content by the communication interface 204 and the output of content by the video output interface 214 to the presentation device 108. In at least one embodiment, the control logic 216 is operable to generate content selection menus, such as electronic programming guide menus, for presentation by the presentation device 108.

The OOB receiver 224 is operable to receive out-of-band data from the head-end 102 via the communication network 104. In at least one embodiment, the OOB receiver 224 comprises a QPSK receiver. The OOB receiver 224 is communicatively coupled to the conditional access module 110A and provides OOB data to the conditional access module 110A for further processing.

The OOB transmitter 224 is operable to transmit out-of-band data to the head-end 102 via the communication network 104. In at least one embodiment, the OOB transmitter 224 comprises a QPSK transmitter. The OOB transmitter 224 is communicatively coupled to the conditional access module 110A and receives OOB data from the conditional access module 110A and initiates transmission of the OOB data to the head-end 102 via the communication network 104.

The television receiver 106A further includes a socket sized to receive the conditional access module 110A. The conditional access module interface 208 includes a plurality of pins that engage corresponding pins of the conditional access module 110A. The various pins of the conditional access module interface 208 are communicatively coupled to the demodulator 220, the OOB receiver 224, the OOB transmitter 224, the demultiplexor 210 and the control logic 216.

The conditional access module 110A includes an OOB data processor 230 operable to receive inbound OOB data from the OOB receiver 224 and further process such OOB data as appropriate. In at least one embodiment, the OOB data processor 230 generates outbound OOB data which is provided to the OOB transmitter 222 for transmission across the communication network 104. In at least one embodiment, the inbound and outbound OOB data comprise access control data and tuning data, such as channel assignments, EMMs, ECMs and the like. The OOB data processor 230 may further provide data generated from the OOB data to the control logic 216 of the television receiver 106A via the host communication interface 234 for further processing.

The IB data processor 232 receives in-band (IB) input data from the demodulator 220 and processes the data to generate IB output data provided to the demultiplexor 210. More particularly, in at least one embodiment, the IB data processor 232 receives encrypted audio/video content and performs decryption processing to provide unencrypted audio/video content to the demultiplexor 210. The encryption may be performed by the LB data processor 232 using OOB data received/processed by the OOB data processor 230. For example, the OOB data may include decryption keys (e.g., EMMs, ECMs or data derived therefrom) utilized by the IB data processor 232 to decrypt the IB data (e.g., audio/video content).

The host communication interface 234 is operable to process various data received by the conditional access module 110A and exchange data with the control logic 216 of the television receiver 106A. In at least one embodiment, the control logic 216 and the host communication interface 234 exchange data in an Application Protocol Data Unit (APDU) format. For example, the host communication interface 234 may provide the control logic 216 with data which it utilized to control the reception and/or transmission of data by the various components of the communication interface 204.

As discussed above, it is desirable for manufacturers to test all of the communication pathways of the television receiver 106A during the manufacturing process to verify that the television receiver 106A functions correctly. However, many manufacturers may not have access to the head-end 102, the communication network 104 and/or the conditional access module 110A in order to perform testing of the cable television receiver 106A. In other scenarios, it may be undesirable for a manufacturer to utilize the head-end 102, the communication network 104 and/or the conditional access module 110A for testing purposes.

Figure 3:
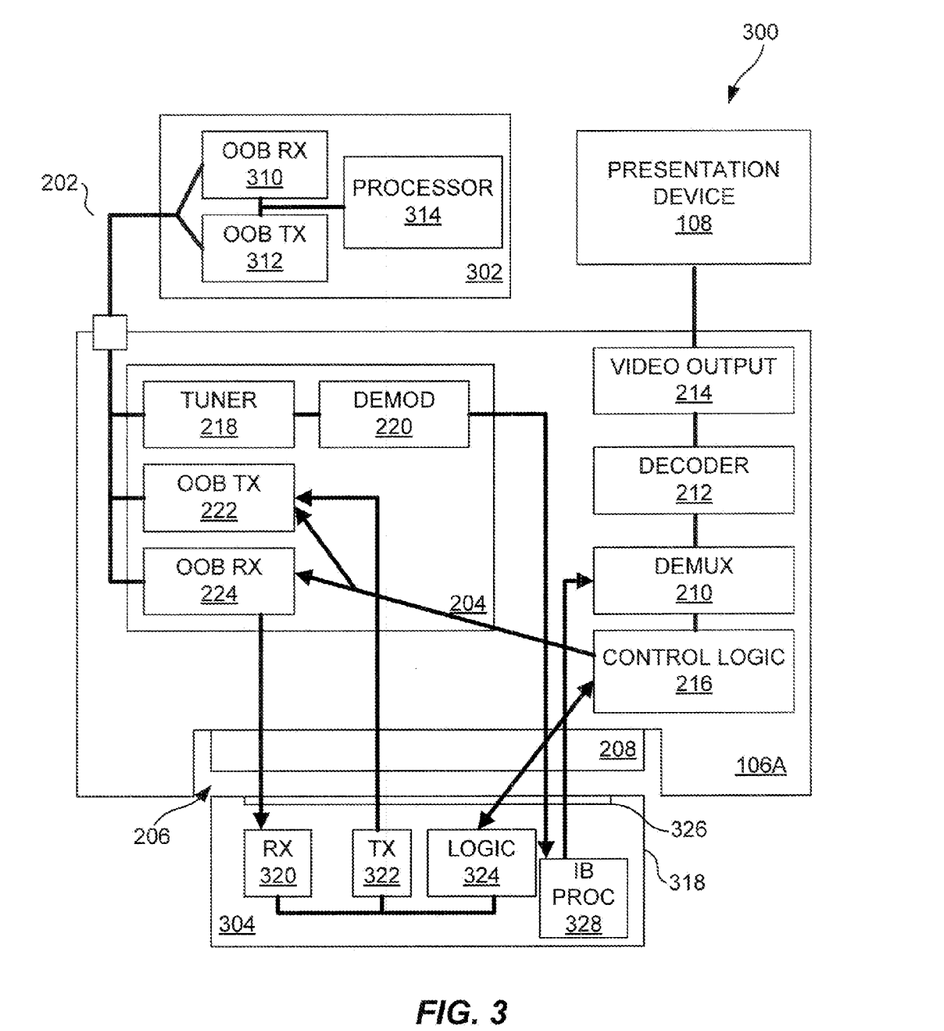
FIG. 3 illustrates a testing environment that facilitates the testing of the television receiver of FIGS. 1-2.

In accordance with the teachings described herein, FIG. 3 illustrates a testing environment 300 that facilitates the testing of the television receiver 106A of FIGS. 1-2. The testing environment 300 includes a television receiver 106A, a presentation device 108, basic error rate testing (BERT) apparatus 302 and a conditional access module simulator 304. The conditional access module simulator 304 is utilized in place of the conditional access module 110A of FIGS. 1-2. Each of the components of the testing environment 300 are discussed in greater detail below and the discussion of components common to FIGS. 1-2 is omitted herein for the sake of brevity.

The BERT apparatus 302 communicatively couples to a communication interface 204 of the television receiver 106A. The BERT apparatus 302 may be configured to test any number of television receivers 106A concurrently or simultaneously, depending on desired design criteria. For example, the BERT apparatus 302 may communicatively couple to multiple television receivers 106A via a coaxial cable communication network. The BERT apparatus 302 may exchange testing data with specific addressable television receivers 106A for testing purposes.

In at least one embodiment, the BERT apparatus 302 communicatively couples to the cable connector 202 via appropriate cabling or a corresponding connector (e.g., coaxial cabling and/or an F-connector). The BERT apparatus 302 is operable to transmit OOB output test data to the television receiver 106A and receive OOB input test data from the television receiver 106A. The BERT apparatus 302 performs appropriate analysis of the OOB input test data to determine whether the television receiver 106A operates correctly.

The BERT apparatus 302 includes an OOB receiver 310, an OOB transmitter 312 and a processor 314. Each of these components is discussed in greater detail below. The BERT apparatus 302 may include other components, elements or devices not illustrated for the sake of brevity.

The OOB transmitter 312 is communicatively coupled to the television receiver 106A via appropriate cabling or connections. The OOB transmitter 312 operates to transmit OOB input test data to the television receiver 106A. The OOB input test data may be generated by the processor 314. In at least one embodiment, the OOB transmitter 312 comprises a QPSK modulator that modulates the OOB input test data in a QPSK signal for transmission to the television receiver 106A.

The OOB receiver 310 is communicatively coupled to the television receiver 106A via appropriate cabling or other connections. In at least one embodiment, the OOB receiver 310 and the OOB transmitter 312 may be communicatively coupled to the television receiver 106A via a single cable or other physical connection. The OOB receiver 310 operates to receive OOB input test data from the television receiver 106A. In at least one embodiment, the OOB transmitter 312 comprises a QPSK demodulator that receives the OOB input test data in a QPSK signal in the analog domain and performs appropriate demodulation to convert the OOB input test data into digital data that may be further processed by the processor 314.

The processor 314 is operable for controlling the operation of the BERT apparatus 302. As used herein, processor 314 refers to a single processing device or a group of inter-operational processing devices. The operation of processor 314 may be controlled by instructions executable by processor 314. Some examples of instructions are software, program code and firmware. Various embodiments of processor 314 include any sort of microcontroller or microprocessor executing any form of software code. In at least one embodiment, the processor 314 generates the OOB output test data that the OOB transmitter 312 transmits to the television receiver 106A. Furthermore, the processor 314 receives the OOB input test data from the OOB receiver 310 and analyzes the OOB output test data to determine whether the communication interface 204 of the television receiver 106A functions correctly.

In at least one embodiment, the processor 314 determines whether the OOB output test data and the OOB input test data are identical to determine whether communication interface 204 functions correctly. For example, the communication interface 204 may be identified as malfunctioning if the OOB output test data and the OOB input test data are different. In another embodiment, the processor 314 may determine whether the OOB output test data is a known output correlating with the OOB input test data. If the OOB output test data is a known output correlating with the OOB input test data, then the processor 314 identifies that the communication interface 204 functions correctly. However, if the OOB output test data is not a known output correlating with the OOB input test data, then the processor 314 identifies that the communication interface 204 is not functioning correctly.

As described above, the conditional access module simulator 304 operates to simulate an actual conditional access module during a testing process. The conditional access module simulator 304 includes a housing 318, a receiver interface 320, a transmitter interface 322, control logic 324, a pin interface 326 and an in-band data processor 328. Each of these components is discussed in greater detail below. The conditional access module simulator 304 may include other components, elements or devices not illustrated for the sake of brevity.

The housing 318 is sized to fit within the socket 206. In at least one embodiment, the housing 318 is sized in conformity with the CableCard standard. The housing includes a pin interface 326 that is configured to mate with the conditional access module interface 208 of the television receiver 106A. The pin interface 326 provides various communication pathways between the components of the television receiver 106A and the components of the conditional access module simulator 304.

The receiver interface 320 communicatively couples to the OOB receiver 224 via the pin interface 326. The receiver interface 320 is operable to receive OOB input test data from the OOB receiver 224. Control logic 324 processes the OOB input test data to generate OOB output test data. In at least one embodiment, the control logic 324 generates a data payload of the OOB output test data that is identical to the data payload of the OOB input test data. In another embodiments, the control logic 324 generates a known payload of the OOB output test data based on the data payload of the OOB input test data The transmitter interface 322 communicatively couples to the OOB transmitter 222 via the pin interface 326. The transmitter interface 322 is operable to transmit the OOB output test data to the OOB transmitter 222. The OOB transmitter 222 then transmits the OOB output test data to the OOB receiver 310 of the BERT apparatus 302 for further processing. Thus, through the operation of the testing environment 300, a manufacturer may verify the operation of the television receiver 106A without a head-end 102 (see FIG. 1), communication network 104 and/or conditional access module 110.

In at least one embodiment, the conditional access module simulator 304 may include in-band data processor 328 operable to perform appropriate processing of in-band data received from the demodulator 220. For example, the in-band data processor 328 may pass through video data from the demodulator 220 to the demultiplexor 210 and/or perform video decryption processing, depending on desired design criteria. An operator may view the presentation device 108 to verify the correct functionality of the in-band data path of the television receiver 106A.

In at least one embodiment, the conditional access module simulator 304 may optionally include circuitry (not shown in FIG. 3) operable to perform appropriate communication with the control logic 216 of the television receiver 106A. Furthermore, the circuitry may perform appropriate verification of the communication path with the control logic 216. In at least one embodiment, such circuitry may be integrated with the control logic 324. Similar circuitry is described in detail below in regard to FIG. 4 and further discussion is omitted herein for the sake of brevity.

Figure 4:
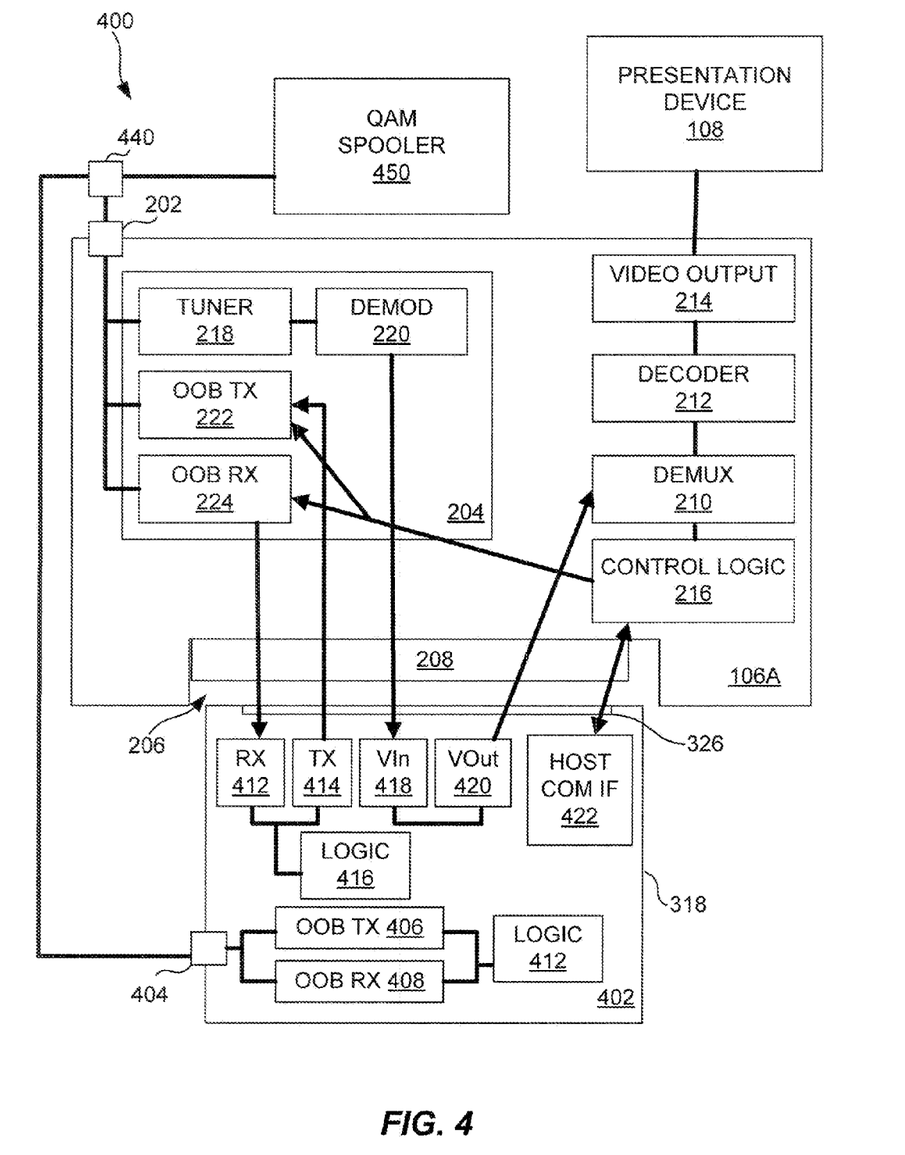
FIG. 4 illustrates another testing environment that facilitates the testing of the television receiver of FIGS. 1-2.

FIG. 4 illustrates another testing environment 400 that facilitates the testing of the television receiver 106A of FIGS. 1-2. The testing environment 400 includes a television receiver 106A, a presentation device 108, a testing apparatus 402, a diplexer 440 and a QAM spooler 450. The testing apparatus 402 is utilized in place of the head-end 102 and the conditional access module 110A of FIGS. 1-2. Each of the components of the testing environment 400 are discussed in greater detail below and the discussion of components common to FIGS. 1-2 is omitted herein for the sake of brevity.

The testing apparatus 402 includes a housing 318, a pin interface 326, a cable connector 404, an OOB transmitter 406, an OOB receiver 408, first control logic 410, a receiver interface 412, a transmitter interface 414, second control logic 416, a video receiver input interface 418, a video receiver output interface 420 and a host communication interface 422. Each of these components is discussed in greater detail below and the further discussion of components common to FIGS. 1-3 is omitted herein. The testing apparatus 402 may include other components, elements or devices not illustrated for the sake of brevity.

The cable connector 404 is operable to communicatively couple the testing apparatus 402 with the communication interface 204. In at least one embodiment, the cable connector 404 comprises an F-connector that communicatively couples to the diplexer 440 via coaxial cable. The diplexer 440 communicatively couples the testing apparatus 402 to the cable connector 202 of the television receiver 106A via coaxial cable. The cable connector 404 may be located along an edge of the housing 318 that is not inserted into the socket 206 during operation. For example, the cable connector 404 may be located on an edge of the housing 318 opposing the pin interface 326.

The diplexer 440 is operable to multiplex data from the testing apparatus 402 with audio/video data from the QAM spooler 450. The QAM spooler 450 is operable to provide video data to the television receiver 106A. The QAM spooler 450 provides the in-band data input to the television receiver 106A during the testing process.

The OOB transmitter 406 is operable to simulate a transmitter of the head-end 102 (see FIG. 1) and transmit messages to the communication interface 204. More particularly, the OOB transmitter 406 transmits OOB data to the communication interface 204. In at least one embodiment, the OOB transmitter 406 is similar to the OOB transmitter 312 (see FIG. 3) and further discussion is omitted herein for the sake of brevity.

The OOB receiver 408 is operable to simulate a receiver of the head-end 102 (see FIG. 1) and receive messages from the communication interface 204. More particularly, the OOB receiver 408 receives OOB data from the communication interface 204. In at least one embodiment, the OOB receiver 408 is similar to the OOB receiver 310 (see FIG. 3) and further discussion is omitted herein for the sake of brevity.

The first control logic 410 is communicatively coupled to the OOB transmitter 406 and the OOB receiver 408. The first control logic 410 is operable to generate and initiate transmission of OOB input test data to the communication interface 204. The first control logic 410 is also operable to receive OOB output test data from the communication interface 204 via the OOB receiver 408.

The first control logic 410 is operable to analyze the OOB output test data based on the OOB input test data to determine whether the OOB receiver 224 and the OOB transmitter 224 of the communication interface 204 for the television receiver 106A function correctly. For example, the first control logic 410 may determine whether the data payloads of the OOB output test data and the OOB input test data are identical to determine whether the communication interface 204 of the television receiver 106A functions correctly. In other embodiments, the first control logic 410 may be operable to determine whether the OOB output test data is a known output correlating with the OOB input test data to determine whether the communication interface 204 of the television receiver 106A functions correctly. In at least one embodiment, the first control logic 410 may be similar to the processor 314.

The receiver interface 412 communicatively couples to the first OOB receiver 224 of the cable television receiver 106A via a pin interface 326. The receiver interface 412 is operable to receive the OOB input test data from the first OOB receiver 224 of the cable television receiver 106A. The receiver interface 412 may be similar to the receiver interface 320 (see FIG. 3) and further discussion is omitted herein for the sake of brevity.

The second control logic 416 of the testing apparatus 402 is operable to generate an OOB output test data based on the OOB input test data. In at least one embodiment, the control logic 416 generates a data payload of the OOB output test data that is identical to the data payload of the OOB input test data. In another embodiment, the control logic 416 generates a known payload of the OOB output test data based on the data payload of the OOB input test data. The first and second control logics 410 and 416 may be any number of discrete or integrated circuitry depending on desired design criteria.

The transmitter interface 414 communicatively couples to the OOB transmitter 222 via the pin interface 326. The transmitter interface 414 is operable to receive the OOB output test data from the second control logic 416 and transmit the OOB output test data to the OOB transmitter 222. The OOB transmitter 222 then transmits the OOB output test data to the OOB receiver 408 of the testing apparatus 402 for further processing. Thus, through the operation of the testing environment 300, a manufacturer may verify the operation of the television receiver 106A without a head-end 102 (see FIG. 1), communication network 104 and/or conditional access module 110.

The testing apparatus 402 may further include a video receiver input interface 418 and a video receiver output interface 420 that further simulate the video processing performed by the conditional access module 110 (see FIG. 1). For example, the video receiver output interface 420 may output (e.g., pass through) in-band data received from the television receiver 106A via video receiver input interface 418. In some embodiments, control circuitry (not shown in FIG. 4) may perform decryption of in-band data and output the decrypted audio/video content to the television receiver 106A for further processing and output. In at least one embodiment, the video receiver input interface 418 and a video receiver output interface 420 may be similar to the IB data processor 232 (see FIG. 4).

The host communication interface 422 is operable to process various data received by the conditional access module 110A and exchange data with the control logic 216 of the television receiver 106A. In at least one embodiment, the control logic 216 and the host communication interface 422 exchange data in an APDU format. For example, the host communication interface 422 may provide the control logic 216 with data which it utilized to control the reception and/or transmission of data by the various components of the communication interface 204. The host communication interface 422 may further perform analysis regarding the communication pathways between the host communication interface 422 and the control logic 216 to identify any problems therewith.

In accordance with the techniques described in FIG. 4, all generation of testing data as well as analysis thereof regarding the communication pathways of the television receiver 106A is performed via the testing apparatus 402. The testing apparatus 402 may be further configured to output data regarding the analysis of the OOB communication path and/or the host communication path for further processing and/or presentation by other systems. For example, the testing apparatus 402 may output the analysis data for reception and processing by a remote terminal. In at least one embodiment, the control logic 410 outputs a video signal regarding the analysis results that is transmitted to the television receiver 106A via the video output interface 420 for display via the presentation device 108.

Figure 5:
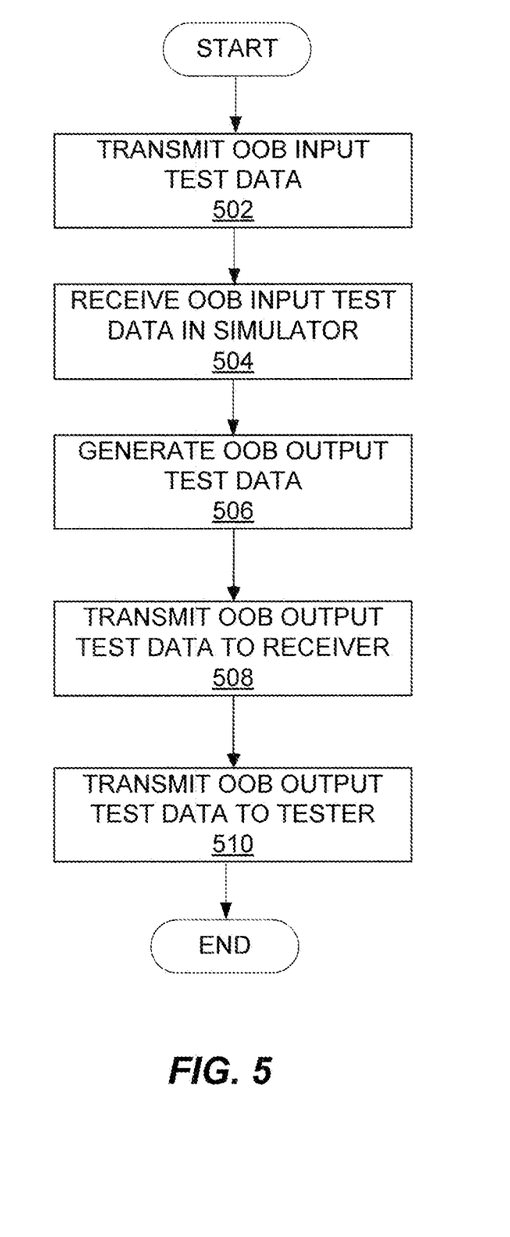
FIG. 5 illustrates an embodiment of a process for testing communication paths of a television receiver.

FIG. 5 illustrates an embodiment of a process for testing communication paths of a television receiver. The process of FIG. 5 is particularly described in the context of testing OOB communication pathways of a television receiver. The process of FIG. 5 may include other operations not illustrated for the sake of brevity.

The process includes transmitting OOB input test data to a communication interface of a cable television receiver (operation 502). In at least one embodiment, the OOB input test data may be modulated in a QPSK signal. The OOB input test data may be generated by an external testing apparatus (e.g., the BERT apparatus 302 (see FIG. 3)) communicatively coupled to the television receiver or a conditional access module simulator coupled to the television receiver via an internal socket (e.g., the testing apparatus 402 (see FIG. 4)).

The process further includes receiving the OOB input test data in a conditional access module simulator communicatively coupled to the television receiver (operation 504). The process further includes generating OOB output test data based on the OOB input data at the conditional access module simulator (operation 506) and initiating transmission of the OOB output test data to the communication interface of the cable television receiver (operation 508). The process further includes transmitting the OOB output test data from the communication interface of the cable television receiver to the testing apparatus (operation 510). Upon reception of OOB output test data by the testing apparatus, the process further includes analyzing the OOB output test data based on the OOB input test data to determine whether the communication interface of the cable television receiver functions correctly.

Although specific embodiments were described herein, the scope of the invention is not limited to those specific embodiments. The scope of the invention is defined by the following claims and any equivalents therein.

We claim:

1. A testing apparatus comprising:
a cable television receiver;
an out-of-band (OOB) transmitter communicatively coupled to the cable television receiver, the OOB transmitter operable to transmit OOB input test data to the cable television receiver;
an OOB receiver communicatively coupled to the cable television receiver, the OOB receiver operable to receive OOB output test data from the cable television receiver;
a processor communicatively coupled to the OOB receiver and the OOB transmitter, the processor operable to analyze the OOB output test data based on the OOB input test data to determine whether a communication interface of the cable television receiver functions correctly;
the cable television receiver, the OOB transmitter, the OOB receiver and the processor all being completely and fully isolated from a head end.

2. The testing apparatus of claim 1, wherein the OOB transmitter comprises a quadature phase-shift keying (QPSK) modulator and the OOB receiver comprises a QPSK demodulator.

3. The testing apparatus of claim 1, wherein the OOB input test data and the OOB output test data comprise identical data payloads.

4. The testing apparatus of claim 1, wherein the processor is operable to determine whether the OOB output test data is a known output correlating with the OOB input test data.

5. A testing apparatus comprising:
a cable television receiver;
a housing configured for mating with a socket of the cable television receiver;
a receiver interface positioned within the housing and communicatively coupled to an out-of-band (OOB) receiver of the cable television receiver, the receiver interface operable to receive OOB input test data from the OOB receiver;
a transmitter interface positioned within the housing and communicatively coupled to an OOB transmitter of the cable television receiver, the transmitter interface operable to transmit OOB output test data to the OOB transmitter;
control logic positioned within the housing and communicatively coupled to the receiver interface and the transmitter interface, operable to generate the OOB output test data based on the OOB input test data;
the cable television receiver being connected directly to the housing that contains the receiver interface, the transmitter interface, and the control logic and both the cable television receiver and the housing being fully and completely isolated from a head end.

6. The testing apparatus of claim 5, wherein the housing includes a plurality of pins disposed along at least one edge of the housing, at least a first one of the plurality of pins operable to communicatively couple the receiver interface with the OOB receiver and at least a second one of the plurality of pins operable to communicatively couple the transmitter interface with the OOB transmitter.

7. The testing apparatus of claim 5, wherein the housing is sized in conformity with the CableCard standard.

8. The testing apparatus of claim 5, further comprising a host communication interface communicatively coupled to a processor of the cable television receiver, the control logic operable to generate application protocol data unit (APDU) data and initiate transmission of the APDU data to the processor via the host communication interface.

9. The testing apparatus of claim 8, wherein the APDU data is configured to control the reception of the OOB input test data by the OOB receiver and the transmission of the OOB output test data by the OOB transmitter.

10. The testing apparatus of claim 5, wherein a payload of the generated OOB output test data is identical to a payload of the OOB input test data.

11. The testing apparatus of claim 5, further comprising:
a video receiver input interface operable to receive in-band (IB) input data from an IB data receiver of the cable television receiver; and
a video receiver output interface operable to receive the IB input data from the video receiver input interface and initiate transmission of an IB output data to a demultiplexer of the cable television receiver.

12. A testing apparatus comprising:
a cable television receiver;
a housing configured for mating with a socket of the cable television receiver;
a first out-of-band (OOB) transmitter positioned within the housing and communicatively coupled to the cable television receiver, the first OOB transmitter operable to transmit OOB input test data to a first OOB receiver of the cable television receiver;

a receiver interface positioned within the housing and communicatively coupled to the first OOB receiver of the cable television receiver, the receiver interface operable to receive the OOB input test data from the first OOB receiver of the cable television receiver;

first control logic positioned within the housing and configured to receive the OOB input test data from the receiver interface, operable to generate OOB output test data based on the OOB input test data, and configured to send the OOB output test data to a transmitter interface;

the transmitter interface positioned within the housing and communicatively coupled to a second OOB transmitter of the cable television receiver, the transmitter interface operable to transmit the OOB output test data to the second OOB transmitter of the cable television receiver;

a second OOB receiver positioned within the housing and communicatively coupled to the cable television receiver, the second OOB receiver operable to receive the OOB output test data from the second OOB transmitter of the cable television receiver; and second control logic positioned within the housing and configured to receive the OOB output test data and the OOB input test data, and operable to analyze the OOB output test data based on the OOB input test data to determine whether the first OOB receiver and the second OOB transmitter of the cable television receiver function correctly;

the cable television receiver being connected directly to the housing that contains the first OOB transmitter, the receiver interface, the first control logic, the transmitter interface, the second OOB receiver, and the second control logic and both the cable television receiver and the housing being fully and completely isolated from a head end.

13. The testing apparatus of claim 12, wherein the first OOB transmitter comprises a quadature phase-shift keying (QPSK) modulator and the second OOB receiver comprises a QPSK demodulator.

14. The testing apparatus of claim 12, wherein the QPSK modulator and the QPSK demodulator are communicatively coupled to the first OOB receiver and the second OOB transmitter through a single coaxial cable.

15. The testing apparatus of claim 12, wherein the OOB input test data and the OOB output test data comprise identical data payloads.

16. The testing apparatus of claim 12, wherein the second control logic is operable to determine whether the OOB output test data is a known output correlating with the OOB input test data.

17. The testing apparatus of claim 12, wherein the housing is sized in conformity with the CableCard standard.

18. The testing apparatus of claim 12, further comprising a host communication interface communicatively coupled to a processor of the cable television receiver, the control logic operable to generate application protocol data unit (APDU) data and initiate transmission of the APDU data to the processor via the host communication interface.

19. The testing apparatus of claim 18, wherein the APDU data is configured to control the reception of the OOB input test data by the OOB receiver and the transmission of the OOB output test data by the OOB transmitter.

20. The testing apparatus of claim 12, further comprising:
a video receiver input interface operable to receive in-band (IB) input data from an IB data receiver of the cable television receiver; and
a video receiver output interface operable to receive the IB input data from the video receiver input interface and initiate transmission of an IB output data to a demultiplexer of the cable television receiver.

* * * * *